(12) United States Patent
Ellis et al.

(10) Patent No.: US 11,358,828 B2
(45) Date of Patent: Jun. 14, 2022

(54) UNWINDING OF MATERIALS

(71) Applicants: HEXCEL COMPOSITES LIMITED, Duxford (GB); HEXCEL CORPORATION, Dublin, CA (US)

(72) Inventors: John Ellis, Duxford (GB); Anthony Loccisano, Stockholm (SE)

(73) Assignees: HEXCEL COMPOSITES LIMITED, Duxford (GB); HEXCEL CORPORATION, Dublin, CA (US)

( * ) Notice: Subject to any disclaimer, the term of this patent is extended or adjusted under 35 U.S.C. 154(b) by 210 days.

(21) Appl. No.: 16/756,074

(22) PCT Filed: Oct. 18, 2018

(86) PCT No.: PCT/EP2018/078604
§ 371 (c)(1),
(2) Date: Apr. 14, 2020

(87) PCT Pub. No.: WO2019/081347
PCT Pub. Date: May 2, 2019

(65) Prior Publication Data
US 2020/0255254 A1 Aug. 13, 2020

Related U.S. Application Data

(60) Provisional application No. 62/575,589, filed on Oct. 23, 2017.

(30) Foreign Application Priority Data

Nov. 30, 2017 (GB) ..................... 1719981

(51) Int. Cl.
*B65H 49/20* (2006.01)

(52) U.S. Cl.
CPC ....... *B65H 49/20* (2013.01); *B65H 2701/312* (2013.01); *B65H 2701/314* (2013.01); *B65H 2701/38* (2013.01)

(58) Field of Classification Search
CPC ......... B65H 49/18; B65H 49/20; B65H 49/26
See application file for complete search history.

(56) References Cited

U.S. PATENT DOCUMENTS

| 4,087,060 A | 5/1978 | Laky et al. |
| 4,830,298 A | 5/1989 | Blunk |

(Continued)

FOREIGN PATENT DOCUMENTS

| DE | 3343285 A1 | 6/1985 |
| DE | 102007012609 A1 | 9/2008 |

(Continued)

OTHER PUBLICATIONS

GB Search Report (SR) issued in the priority Application No. GB1719981.1, dated May 31, 2018.

(Continued)

*Primary Examiner* — William E Dondero
(74) *Attorney, Agent, or Firm* — W. Mark Bielawski (57) ABSTRACT

There is provide a process for unwinding material from a spool (2) wherein the angle ($\Theta$) of take off at the first contact point (4) for the unwind is always in the range 0±20°, and wherein the first contact point (4) for the unwind is no more than 600 mm from the axis (3) of rotation of the spool (2). There is also provided an apparatus for the unwinding of material from a spool (2) comprising an axis (3) upon which a spool (2) may be rotatably mounted and a static first contact point (4) for the unwound material positioned no more than 600 mm from the centre of the axis (3), wherein the angle ($\Theta$) of take off at the first contact point (4) for the unwind is always in the range 0±20°.

3 Claims, 5 Drawing Sheets

(56) References Cited

U.S. PATENT DOCUMENTS

| | | | |
|---|---|---|---|
| 4,838,500 A | 6/1989 | Graham | |
| 2018/0037512 A1* | 2/2018 | Grossman | ............... C04B 35/80 |

FOREIGN PATENT DOCUMENTS

| | | |
|---|---|---|
| EP | 0351777 A1 | 1/1990 |
| JP | S60128169 A | 7/1985 |
| JP | 3239420 A | 10/1991 |

OTHER PUBLICATIONS

International Search Report (ISR) and Written Opinion (WO) issued in the related International Application No. PCT/EP2018/078604, dated Feb. 5, 2019.

\* cited by examiner

UNWINDING OF MATERIALS

The present invention relates to the unwinding of materials from cores such as spools. In particular it relates to unwinding of materials that are laid up after unwinding especially materials that are impregnated with resin and laid up in a mould and cured in the mould.

Although the invention may be useful with respect to unwinding any linear material, it is particularly useful with respect to the unwinding of fibres, tapes and multifilament tows, such as multifilament tows of carbon or glass fibres that are subsequently used in the production of fibre reinforced composites. Such multifilament tows are often supplied wound on a spool and, for use, they are unwound and then impregnated with a resin composition, either thermosetting or thermoplastic, and subsequently subjected to a moulding and curing operation to produce a fibre reinforced article.

Multifilament tows may be used in order to form composite articles. The tows may be impregnated with a thermosetting resin composition, in uncured or partially cured form, or impregnated with a thermoplastic composition. Layers of fibre such as multifilament tows impregnated in this way are known as prepregs. Prepregs, usually as a plurality of layers of the prepregs, may be laid up in a mould and cured therein to form a composite article. Alternatively multifilament tows may be laid up in a mould in a container, such as a bag, and liquid thermosetting resin may be injected into the bag, perhaps under vacuum, so that it impregnates the multifilament tows, and the resin may then be cured to produce the finished composite article.

In such procedures the fibres or multifilament tows are conveniently provided from spools onto which they have been previously wound. Such wound fibres and tows may then be unwound from the spools, often as part of a continuous process of impregnation, lay up and moulding, to produce the composite article.

Fibres, whether multifilament tows or individual fibres, are usually wound onto a rotating core or spool for transportation. They are usually wound from end to end of the spool in order to provide a uniform or substantially uniform distribution of the fibre or multifilament tow along the length of the spool, and also within the mass of the fibre or multifilament as it builds up in layers as it is deposited along the spool.

Accordingly, the unwinding action must be performed reciprocally across the spool to match the winding pattern. This traditional unwinding however, results in variation in the angle at which the material is removed from the spool across the length of the spool. For example, when the unwinding is from a central position the angle of removal from the spool will be about 90°, but when the material is unwound away from the centre of the spool the angle will decline to be considerably less than 90° at the ends of the spool. The angle at which the material is removed as it moves along the spool will vary, and will depend on the length of the spool and the distance of the point of removal from the surface of the spool. Accordingly, the angle, and therefore the tension in the material, varies as the material is unwound.

This variation in the angle of removal creates variations in the forces that are acting on the fibre or multifilament tow as it is withdrawn from the spool, creating variations within the fibre or multifilament tow; specifically, the tension will increase as the fibre tow moves from the centre to either end of the core it is being unwound from, with tension being a maximum at the extremity. As the fibre tow changes direction to move towards the other end of the unwinding core this tension created by the sharp angle of unwind works on the tow to produce an environment such that the fibre tow can roll over on itself and create a twist in the fibre tow, sometimes known as false twists. Where multifilament tows are employed, the filaments within a tow are generally parallel to each other, and one important property of the tow is that the distribution of the fibres within the tow is such that the desired degree of impregnation of the fibres with a resin can be achieved. However, the variation in the forces to which the fibre or multifilament tow is subjected during unwinding, as discussed above, leads to false twists which can, distort the distribution of the fibre or fibres, and/or restrict the spreadability of the tow so that it does not spread as uniformly as the bulk of the tow, resulting in uneven impregnation and distribution of the resin, and ultimately gaps in the prepreg and defects in the composite product produced from the prepreg.

In another process for unwinding, the first contact point for the unwound material moves laterally backwards and forwards along the spool so that the material is unwound at an angle of substantially 90° everywhere along the length of the spool. However at each end of the traverse it is necessary to reverse the direction at which the unwinding occurs and here again, at the point of change of direction different forces are applied to the fibre or multifilament tow, again disrupting the fibres or the distribution of the fibres within the tow, resulting in the same problems, such as imparting false twists.

Attempts have been made to reduce these problems by reducing the maximum angle at which the fibre is withdrawn from the spool, such as in unwinding systems available from McCoy Machinery Co Inc., in which the spool is mechanically reciprocated relative to the first point of contact and the take off angle is substantially 0°. However, in order for this to be accomplished it has been necessary to increase the distance between the surface of the spool and the first contact point of the unwind; and this has proved to be impractical as requiring more space for the unwinding equipment than is readily or economically available. Furthermore this approach requires a long distance between the surface of the spool and the first contact point, increasing the risk of damage and/or disruption of the fibre or tow between the spool and the first contact point. Additionally, these techniques require the provision of a powered drive to reciprocate the spool, which is complex and costly. Additionally, the value of such systems in overcoming false twisting with multifilament tows in continuous fibre lay up operations has not been recognised.

The present invention aims to address this problem and/or to provide improvements generally.

According to the invention there is provided a process and an apparatus as defined in any of the accompanying claims.

The present invention provides a process for unwinding material from a spool wherein the angle of take off at the first contact point for the unwind is always in the range 0±20°, and wherein the first contact point for the unwind is no more than 600 mm from the axis of rotation of the spool.

The invention further provides an apparatus for the unwinding of material from a spool comprising an axis upon which a spool may be rotatably mounted and a static first contact point for the unwound material positioned no more than 600 mm from the centre of the axis, wherein the angle of take off at the first contact point for the unwind is always in the range 0±20°.

In this application the first contact point for the unwind refers to the location that the unwound material first contacts a surface, such as static or driven rollers, an eyelet or a comb, to provide the desired location and direction of the unwinding material. When the material passes from the spool to the first contact point for the unwind so that the material is removed from the spool at a 90° angle to the axis of the spool (i.e. so that the distance between the position from which the material is unwound and the first contact point is as short as possible), the angle of take off at the first contact point for the unwind is defined as 0°. Thus, the angle of take off at the first contact point is the angle at which the unwinding material reaches the first contact point measured with respect to a perpendicular line between the first contact point and the axis of the spool from which the material is unwound. This angle is nominally given a positive value at one end of the spool and a negative value at the other end of the spool.

We have found that, provided the angle of unwind is in the range 0±20°, the process and apparatus of this invention enables fibres, tapes and multifilament tows to be unwound from a spool at speeds up to 50 meters per minute with significant reduction of the distortion of the fibres, the tapes and the tows and the filaments within a tow, including a reduction or elimination of false twists. We have found that this may be particularly achieved if the spool moves laterally back and forth relative to the first withdrawal point for the unwind and, in a preferred embodiment the first point of withdrawal is fixed. Accordingly, in the process and apparatus of the invention the spool is preferably mounted in a way that it can move transversely and reciprocally relative to the first contact point for the unwind. The transverse reciprocal movement of the spool may be driven mechanically, or, preferably, the movement of the spool is free movement; for example the transverse reciprocal movement is driven due to forces from the unwinding of the material. This is particularly advantageous, because, when the transverse reciprocal movement of the spool is driven by the unwinding of the material from the spool, the movement of the spool automatically adjusts to take account of any irregularities in the winding of the material. For example, if the wound material does not always reach the end of the spool before the direction of winding reverses, the transverse movement of the spool will change when the direction of the winding changes, rather than continuing to the normal position at which the direction of winding changes, and the transverse movement of the spool therefore always stays in phase with the direction in which the unwound material was originally wound.

The transverse reciprocal movement of the spool can be accomplished in any suitable manner. Preferably, the transverse reciprocal movement of the spool is only driven by the unwinding of the material.

In some embodiments of this invention, the first point of contact for the unwind is no more than 400 mm from the axis of rotation of the spool. For practical reasons, in most cases the minimum distance between the first point of contact for the unwind and the axis of rotation will be at least 100 mm.

In some embodiments of this invention, the angle of take off at the first point of contact for the unwind is always in the range 0±10°.

In preferred embodiments of the present invention the first contact point for the unwind does not move transversely with respect to the axis of rotation of the spool, i.e. the first contact point does not move from side to side. It is also preferred that the first contact point for the unwind does not move towards or away from the axis of rotation of the spool. Although in some embodiments of the invention the first contact point for the unwind may move vertically, it is particularly preferred that the distance between the first contact point for the unwind and the axis of rotation of the spool does not change. In particularly preferred embodiments of the invention, the position of the first contact point for the unwind is static.

In a preferred embodiment of this invention, the spool may be located within a hammock type support in which it can move laterally, i.e. transversely, relative to the first contact point for the unwind, so that the direction of movement of the spool is along the axis of its rotation. The action of unwinding the fibrous material from the spool initiates lateral motion of the spool within the hammock, such that the spool moves to maintain the unwinding angle. The surface of the hammock support should be chosen to achieve the desired degree of friction between the surface of the hammock and the surface of the spool provided by the fibre material to ensure movement of the spool at the desired speed without damaging the fibre. Examples of suitable materials for use with multifilament tows of carbon or glass fibre include PTFE coated glass cloth, such as standard grade 7058 Tygadur, available from Taconic Wildcat UK In an alternative preferred embodiment of this invention employing free movement of the spool, the spool is rotatably mounted on an axis provided by a mandrel so that the spool is free to move backwards and forwards along the mandrel. Here again, the mounting should be such that the friction between the spool and the mandrel is such that the spool can reciprocate freely on the mandrel. In this embodiment the axis of the spool is the axis of rotation of the mandrel.

In a further alternative preferred embodiment of this invention the spool is fixedly mounted on a mandrel and the mandrel together with the spool may move transversely and reciprocally relative to the first point of contact for the unwind.

In a particular embodiment of invention employing free movement of the spool, the spool is mounted on a mandrel which is rotatably mounted on an inner cylinder such that the mandrel is free to move backwards and forwards along the inner cylinder. In this embodiment, preferably the mandrel is hollow and can be located around an inner cylinder, and means are provided to reciprocate movement of the mandrel axially along the length of the cylinder as the material is being unwound from the spool. Here the axis of the spool is the axis of the cylinder. In this embodiment, the means to reciprocate the movement of the mandrel may comprise grooves, preferably two grooves, that spiral around the surface of the cylinder, whereby a key provided on the inner surface of the mandrel can be located within the grooves. Accordingly, as the fibre, tape or tow is unwound from the spool the tension in the fibre, tape or tow will exert a force on the mandrel in a way that the force transfers to the key, causing it to move within the spiral grooves, which in turn causes the mandrel to move axially back and forth along the outside of the cylinder. Two spiral grooves are typically provided in the surface of the cylinder so that the first groove causes the mandrel to move in one direction along the axis of the cylinder and the second groove causes the mandrel to move in the opposite direction along the axis of the cylinder. Thus, the spool on the mandrel is caused to move relative to the inner cylinder due to the force of the unwinding of the material. As the spool rotates it drives the movement of the spool on its mandrel back and forth sideways all controlled by the key in the spiral keyway of the inner cylinder, such that unwinding is matching the winding pattern of the fibrous material and, as such, control of the tension of the fibrous material as it is unwound is provided by the control of the keyway frictional forces.

In an alternative form of this embodiment, the key may be provided on the inner surface of the spool; however, the key is preferably provided on the inner surface of the mandrel, and the mandrel is designed so that a spool can be attached around the outside of the mandrel. In this way, one mandrel can be used for the unwinding of many spools without the need for special construction of each spool. Additionally, this allows for the invention to be performed using spools of typical weaker materials, such as cardboard.

The choice of materials for use in this embodiment should be such that the key is retained within the spiral grooves and can move freely within the grooves without causing damage to either the key or the cylinder, or the grooves formed in the cylinder.

The above embodiments all enables the point of unwind from the spool to be maintained substantially in line with the point of first contact of the unwound material regardless of the position on the spool from which the material is being unwound; and this in turn reduces or eliminates the occurrence of false twists in the unwound or unwinding material.

In preferred embodiments of the invention the speed of reciprocal movement of the spool, the speed of rotation of the spool during unwinding and the speed of movement of the unwound material at the first point of contact of the unwind are synchronised to ensure there is appropriate tension in the unwinding material to allow a uniform unwind without damaging the material. Such synchronisation may be computer controlled and/or where appropriate may be controlled from the pitch of the spiral keyway on the inner cylinder. The appropriate speeds will depend upon the nature of the material and, where the unwinding is part of a continuous manufacturing process, the speeds are preferably consistent with those required in the subsequent manufacturing process.

The process of this invention may be computer controlled and the apparatus of the invention may be provided with sensors to follow the path of the spool during the unwind process to keep the spool stable during its travel.

In the invention, means are provided to unwind the material from the spool at the desired speed, and these may be positioned at the first point of contact for the unwind itself or positioned downstream from the first point of contact. Any suitable means to unwind the material from the spool may be used, such as a nip point or a driven roller. Thus, the first contact point for the unwind may be a rotating surface, such as a nip point or driven roller, or a static surface, such as fixed cylinder, and eyelet or a comb.

The invention may be applied to the unwinding of any materials from a spool, such as fibres or tapes; however, it is particularly useful in the unwinding of multifilament tows, especially such tows of carbon, glass or aramid fibre. Multifilament tows comprise a tow that may be made up of several thousand very small fibres arranged substantially parallel to each other within the tow. Typically the number of filaments in a tow can range from 1,000 to 12,000 to 50,000 or greater. Tows of about 12,000 carbon filaments are available from Hexcel, tows of about 24,000 carbon filaments are available from Toray and tows of about 50,000 carbon filaments are available from Zoltek. Tapes that may be unwound in the invention include any relatively narrow width material (i.e. material that may be wound around a spool at different positions along the length of the spool), such as impregnated fibres, for example towpreg or slit tape.

The invention is particularly useful when the fibre tows are to be used for the production of low weight products requiring up to 90 wt % of unidirectional fibres, since in many processes for their production the fibres within the tow need to be spread apart prior to resin impregnation, and the false twisting or distortion of the fibre which occurred when using previous unwinding processes makes spreading and impregnation difficult, and at times impossible. Furthermore, false twists can lead to imperfections in the final product produced from the fibre or tow. Thus the process of the present invention preferably includes a step in which the unwound material is impregnated with a thermoplastic or thermosetting resin, and even more preferably the impregnation is continuous with the unwinding. In preferred embodiments of the invention the impregnated material is moulded to form a composite article, and even more preferably the introduction of the impregnated material into a mould is continuous with the impregnation.

Another application where the invention is particularly useful, is when the fibre or tows are to be used in woven products, where false twists can impair the weaving process, and can also result in imperfections in the finished woven product.

Yet another application where the invention has been found to be useful, is in the continuous processing technologies such as the various forms of automatic tape lay-up, such as Automatic fibre Placement machines, where the tows or tapes are taken from the spool and fed continuously to the lay-up surface, and are impregnated with resin before or after lay up and finally cured. Amongst other applications, these processes are used in the manufacture of automotive and aerospace components, and in the manufacture of wind turbine blades.

Preferred fibres are carbon and glass fibres. Hybrid or mixed fibre systems may also be envisaged. The use of cracked (i.e. stretch-broken) or selectively discontinuous fibres may be advantageous to facilitate lay-up of the product in the continuous article manufacturing processes. The surface mass of fibres within typical fibrous reinforcement of low fibre area weight is generally 10 to 80 $g/m^2$ and in more conventional prepregs is generally 80 to 600 $g/m^2$, and in higher weight industrial type prepregs is 300 to 4000 $g/m^2$. Preferably, for low fibre area weight prepregs and conventional prepregs 10 to 70 $g/m^2$ and 100 to 600 $g/m^2$ respectively, and especially preferably at low fibre areal weights and conventional prepregs 10 to 35 $g/m^2$ and 100 to 300 $g/m^2$. The number of carbon filaments per tow can vary from 1,000 to 320,000, again preferably from 3,000 to 160,000 and most preferably from 6,000 to 48,000. For fibreglass reinforcements, fibres of 600-2400 tex are particularly useful Exemplary unidirectional fibrous tows with which this invention is useful are made from HexTow® carbon fibres, which are available from Hexcel Corporation. Suitable HexTow® carbon fibres for use in making unidirectional fibre tows include: IM7 carbon fibres, which are available as tows that contain 6,000 or 12,000 filaments and weight 0.223 g/m and 0.446 g/m respectively; IM8-IM10 carbon fibres, which are available as tows that contain 12,000 filaments and weigh from 0.446 g/m to 0.324 g/m; and AS7 carbon fibres, which are available in tows that contain 12,000 filaments and weigh 0.800 g/m, tows containing up to 80,000 or 50,000 (50K). The tows typically have a width of from 3 to 7 mm which may be unwound from spools using the process and apparatus of this invention and then fed for impregnation typically on equipment employing combs to hold the tows and keep them parallel and unidirectional.

Where the unwound materials derived from this invention are subsequently impregnated with a resin, the resin used is typically a thermosetting curable resin. Examples of suitable resins are epoxy resin, polyester resins and bismaleimide resins. Resins that have low viscosity at the process temperatures are preferred. Preferred resins are hot melt epoxy resins, and impregnation takes place at the optimum temperature that provides resin of the desired viscosity. The resins usually contain an activator which accelerates the cure process and the activator is frequently used together with an accelerator. Dicyandiamide is a typical activator which may be used together with a urea based accelerator. The relative amount of the activator and the epoxy resin that should be used will depend upon the reactivity of the resin and the nature and quantity of the fibrous reinforcement. Typically from 0.5 to 10 wt % of the urea based or urea derived curing agent based on the weight of epoxy resin is used.

In a continuous process where the unwound material is continuously impregnated with resin the speed of unwind that should be used when employing this invention may be determined by the process temperature used and the viscosity of the resin composition that is used for impregnation at the temperature as well as other conditions employed for impregnation of the material by the resin composition so that the flow of the resin results in the desired degree of impregnation of the unwound material. Preferred resins have a viscosity of from 0.1 Pa·s to 100 Pa·s, preferably from 6 to 100 Pa·s, more preferably from 18 to 80 Pa·s and even more preferably from 20 to 50 Pa·s. It is preferred that the resin content is such that after curing and moulding the composite article contains from 20 to 50 wt %, more preferably 21 to 47 wt %, even more preferably 22 to 45 wt %, and most preferably from 30 to 40 wt % of the resin. The unwind speed employed in this invention can be tailored according to these requirements.

Where the resin used for impregnation is an epoxy resin material component or epoxy resin, it may be selected from any of the commercially available diglycidylethers of Bisphenol-A, either alone or in combination, typical materials in this class include GY-6010 (Huntsman Advanced Materials, Duxford, UK), Epon 828 (Resolution Performance Products, Pernis, Netherlands), and DER 331 (Dow Chemical, Midland, Mich.).

The Bisphenol-A epoxy resin component preferably constitutes from 30 to 50% w/w of the total resin matrix and the remainder may be a different thermosetting resin component material and/or a thermoplastic material and/or any other known resin matrix components, such as hardening agents, for example rubber materials.

Preferred epoxy resins have an Epoxy Equivalent Weight (EEW) in the range from 150 to 1500, preferably a high reactivity such as an EEW in the range of from 200 to 500. Suitable epoxy resins may comprise blends of two or more epoxy resins selected from monofunctional, difunctional, trifunctional and/or tetrafunctional epoxy resins.

The invention is illustrated by reference to the accompany drawings in which.

Figure 1:
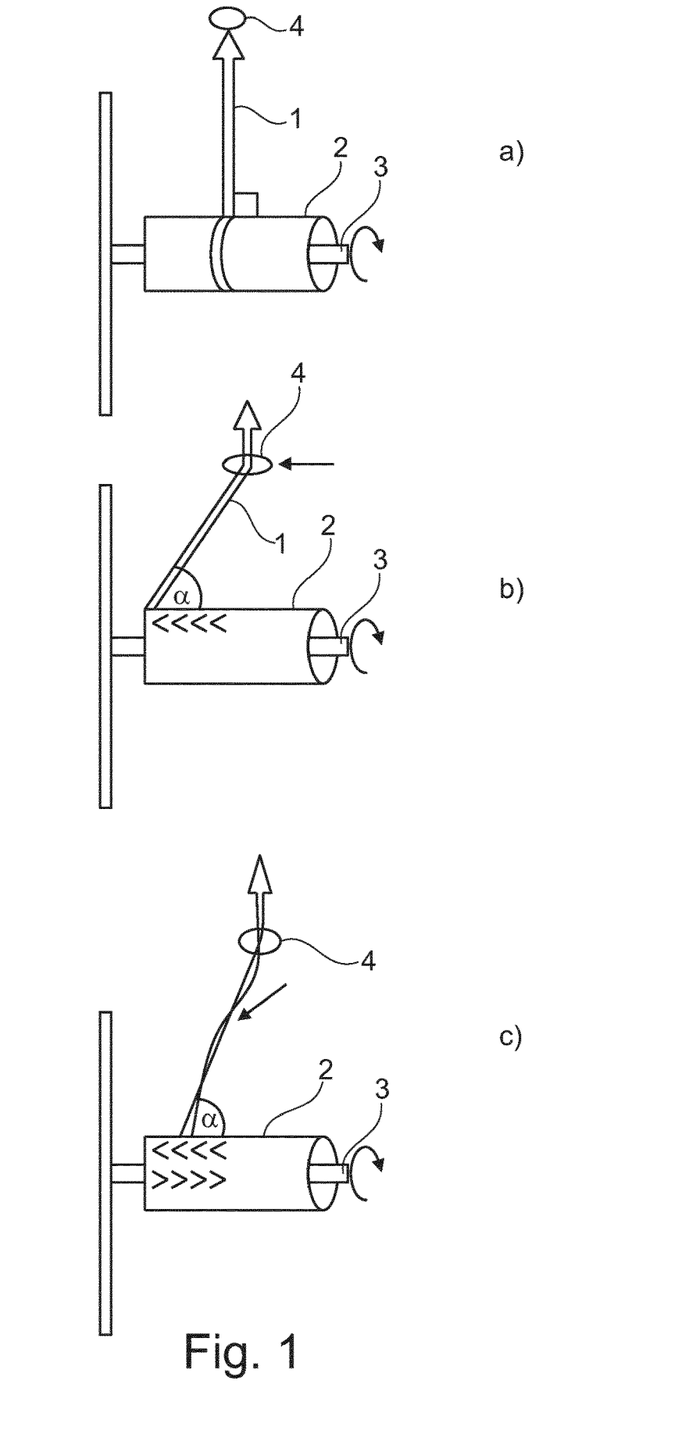
FIG. 1a to 1c show the sequence of unwind in a prior art method where the unwind traverses the surface of the spool.

FIG. 1 shows a prior art process for unwinding of a fibre (1) from a spool (2), rotating about its axis (3), the fibre is taken off through an eyelet or comb (4) which is the first point of contact of the unwind. FIG. 1a shows the fibre being removed at right angles to the surface at the mid-point of the spool. In this position the angle of take off at the first contact point for the unwound fibre is 0°. FIG. 1b shows how as the fibre is being unwound from the spool it moves along the surface of the spool so changing the angle ($\alpha$) at which it is removed from the spool. In FIG. 1b the angle of take off at the first contact point for the unwound fibre is $(90-\alpha)°$, so it can be seen that as the position from which the fibre is removed moves along the spool the angle of take off at the first contact point increases. To distinguish removal from one end of the spool from removal from the other end, this angle is assigned a positive value at one end of the spool a corresponding negative value at the other end of the spool. For example, if the angle $\alpha$ in FIG. 1b is 60° (so that the angle of take off at the first contact point for the fibre is 30°), the angle of take off at this point is referred to as +30° and the angle of take off at the corresponding position at the other end of the spool is referred to as −30°. Due to these change in angle of take off, the fibre is exposed to local forces as well as tensile stress. For ease of understanding, the fibre is illustrated as having two strands, although it could be a multifilament tow with a multitude of fibres. FIG. 1c shows that as the fibres change direction of travel the individual fibres can twist around each other, forming what is known as a false twist, which is undesirable.

Figure 2:
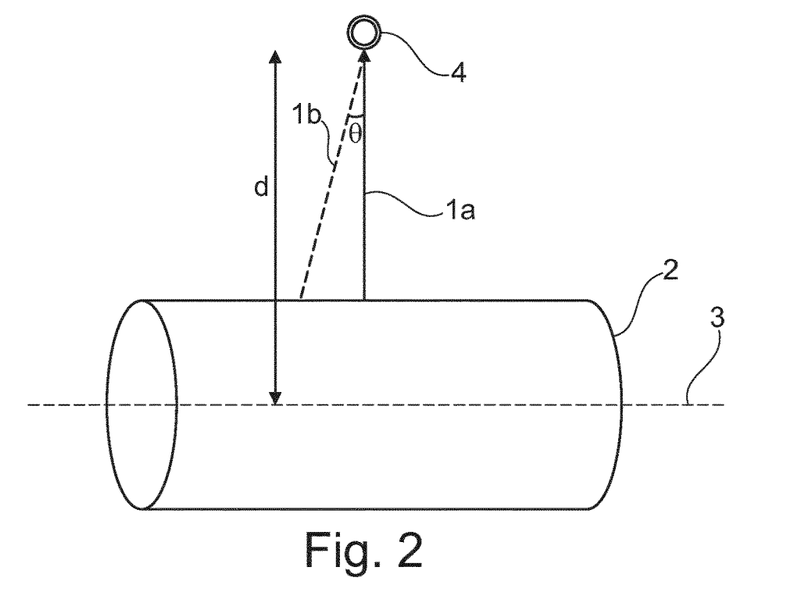
FIG. 2 is a schematic illustration showing the angle and distance of unwind with which the present invention is concerned.

FIG. 2 is an illustration of the dimensions of the unwinding process and apparatus with which the invention is concerned. In FIG. 2 1a indicates a fibre being unwound from a first position directly opposite the first contact point for the unwind (4), 1b indicates a fibre being unwound from a second position along the length of the spool (2), and d is the distance between the axis of rotation of the spool and the first contact point for the unwind. $\theta$ is the angle of take off at the first contact point for the unwind. Thus, when the fibre is unwound in the position shown as 1a, the angle of take off at the first contact point is 0, and when the fibre is unwound at the position shown by 1b the angle of take off at the first contact position is $\theta$, which may be assigned a positive or negative value (with the reverse figure used for the equivalent position towards the other end of the spool). In the present invention the angle $\theta$ should remain in the range $0\pm20°$.

Figure 3A:
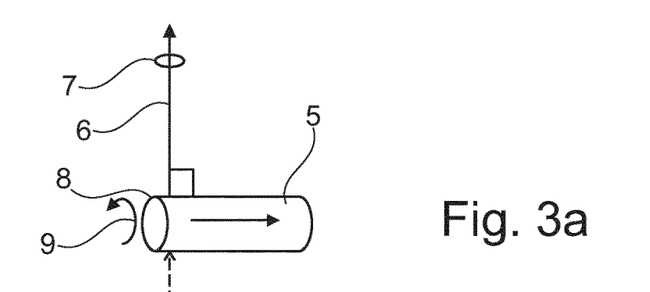
FIG. 3 is a schematic illustration of the invention.
Figures 3B, 3C, 3D:
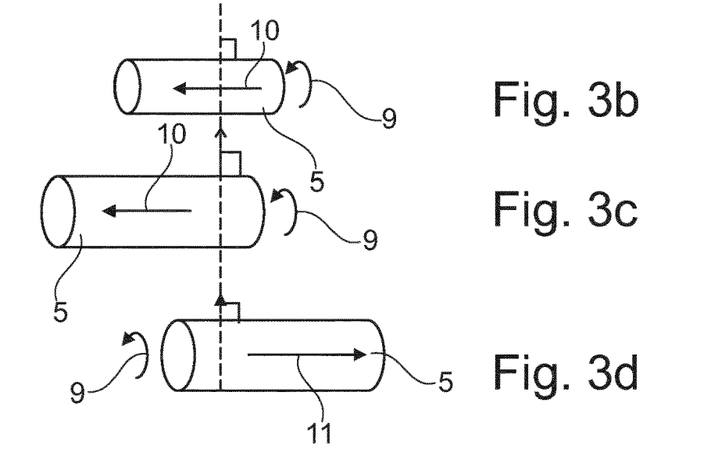

FIGS. 3a to 3d illustrates schematically an unwinding process and apparatus of this invention. The spool designated by numeral 5 is the same spool in each Figure shown in a different position. The spool support, driving and control mechanisms that would be part of a commercial apparatus are not shown. FIG. 3 shows a spool (5) on which is wound a fibrous material (6). The material (6) is being unwound from spool (5) to pass to an eyelet or comb (7), which is the first point of contact of the unwind. The fibre will be taken off by a driven device beyond the eyelet or comb that is not shown. FIG. 3a shows an unwind from one end (8) of the spool (5), which is rotating in the direction shown by arrow (9). The spool moves from the position shown in FIG. 3a in the direction shown by arrow (10) shown in FIGS. 3b and 3c, and in the opposite direction as shown by arrow (11) in FIG. 3d. In this way the fibrous material continues to be withdrawn from the spool at substantially the same angle, although from different positions along the length of the spool, as shown in FIGS. 3b, 3c and 3d. The unwinding continues by the continuous reciprocal movement of the spool so that the unwind continues at about 90° to the surface of the spool and the angle of take off at the first contact point for the unwind remains at about 0°.

Figure 4:
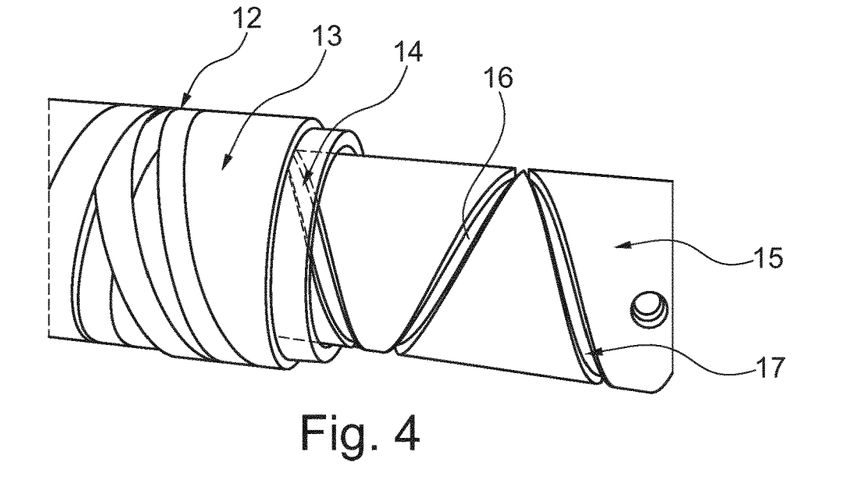
FIG. 4 shows an embodiment of the invention employing intersecting spiral grooves on an inner cylinder to direct the movement of a spool during unwinding.

FIG. 4 illustrates an embodiment in which a fibrous tow (12) on a cardboard spool (13) is fitted around a hollow mandrel (14) which can be moveably located on a cylinder (15) provided with spiral grooves (16) and (17).

Figure 5:
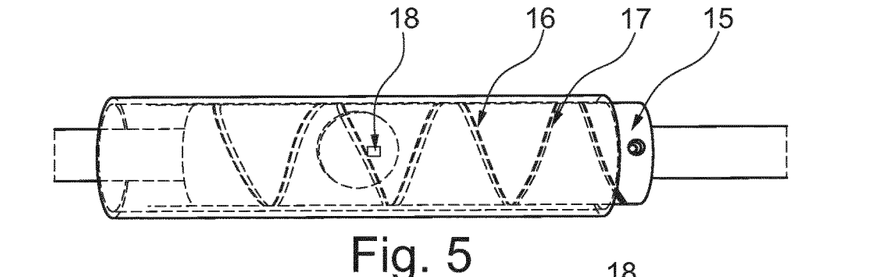
FIG. 5 shows how a key can be employed with the system of FIG. 4 to drive the movement of the spool.

FIG. 5 shows how a key (18) can be present on the inner surface of the hollow mandrel (14) of FIG. 4 to key into the spiral groves (16) and (17) formed on the inner cylinder (15).

Figure 6:
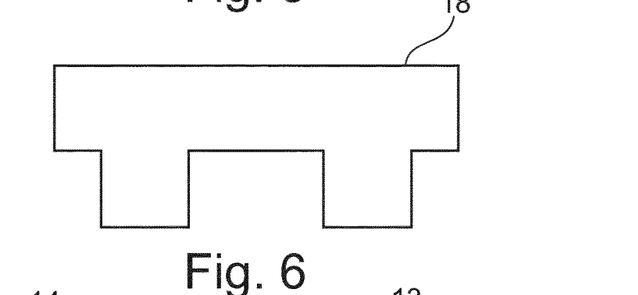
FIG. 6 shows the structure of the key that can be used in the arrangement of FIG. 5.

FIG. 6 shows a key (18) with teeth that can be used to key into the spiral grooves.

Figure 7:
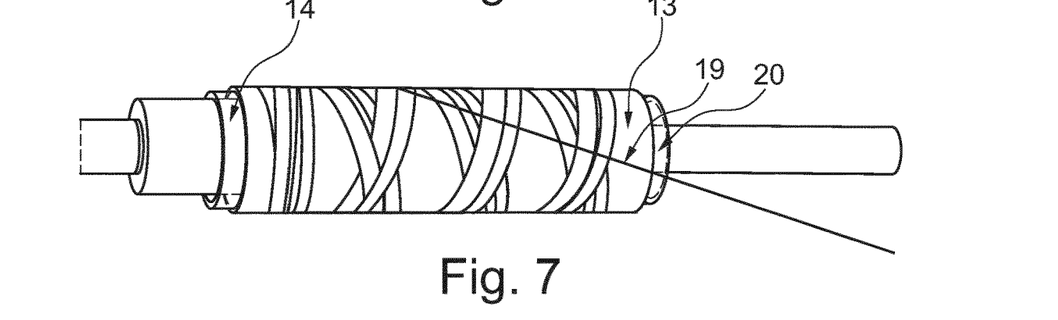
FIGS. 7 and 8 show the operation of the system of FIGS. 4 and 5.
Figure 8:
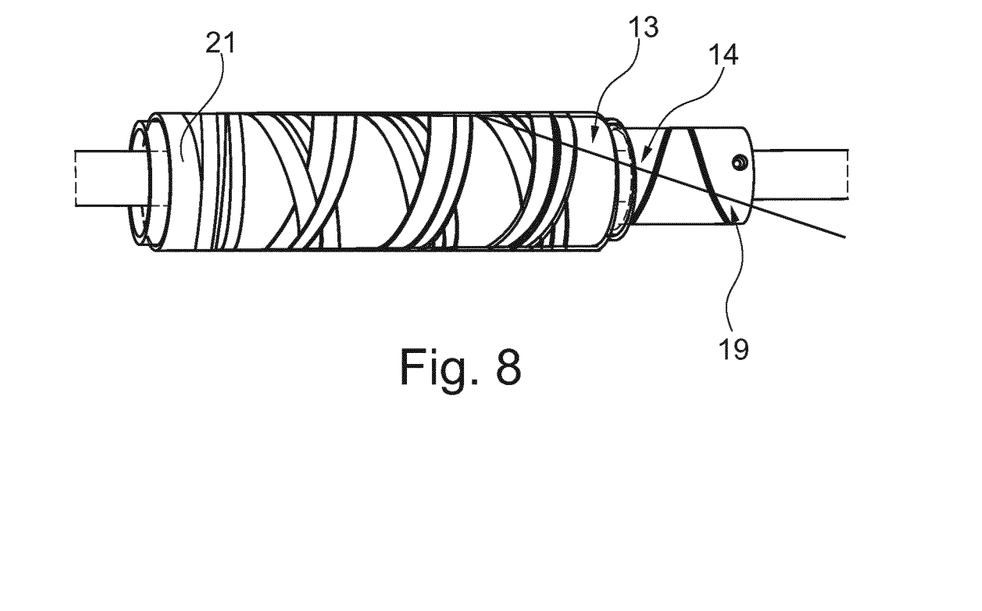

FIGS. 7 and 8 show how the withdrawal of the fibre (19) from the spool (13) causes the mandrel (14) to move from the right hand end (20) of FIG. 7 to the left hand end (21) as shown in FIG. 8, whilst the withdrawal angle of the fibre remains substantially the same.

Figure 9A:
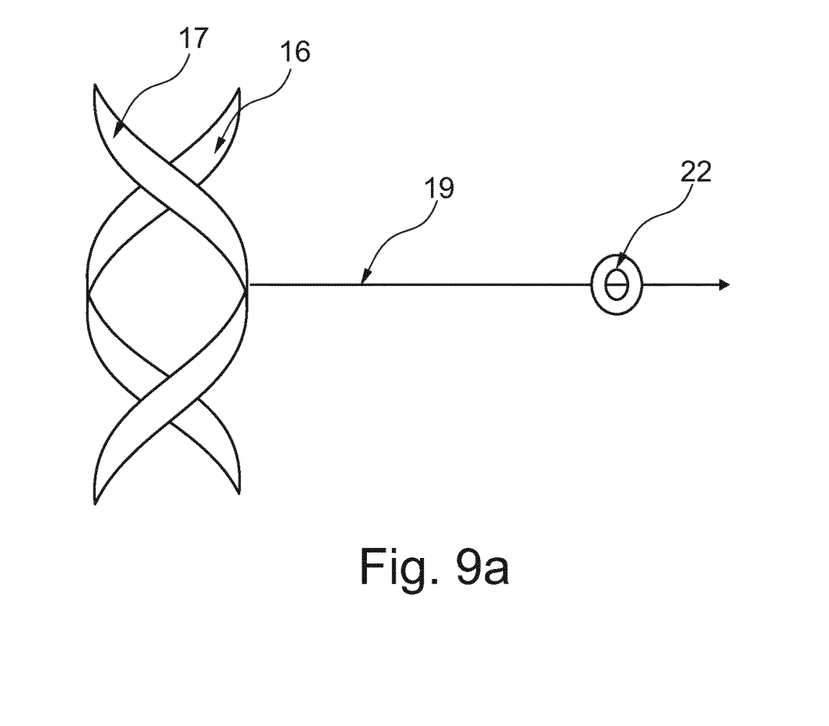
FIGS. 9a, 9b and 9c show the position of unwind as controlled by the spiral grooves shown in FIGS. 4 to 8.
Figure 9B:
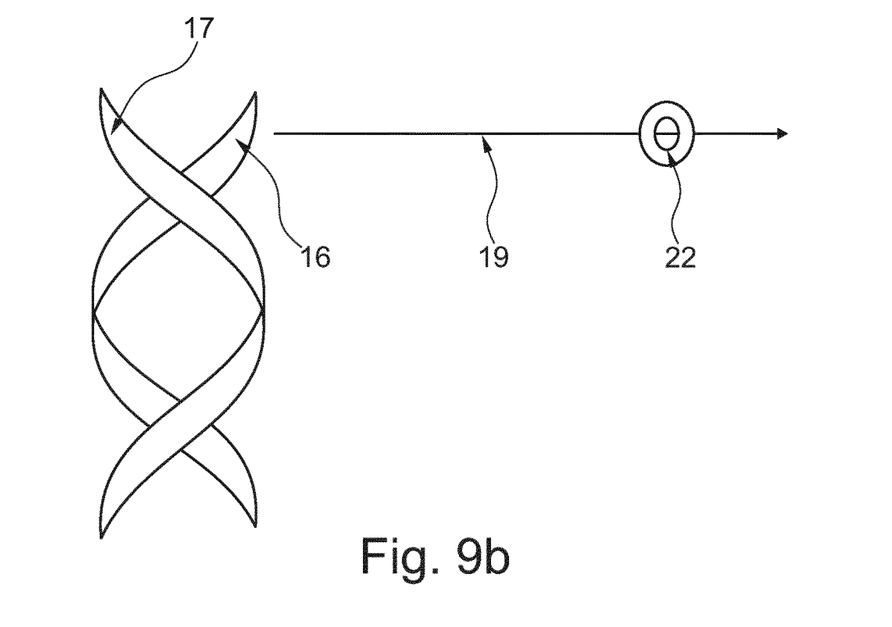
Figure 9C:
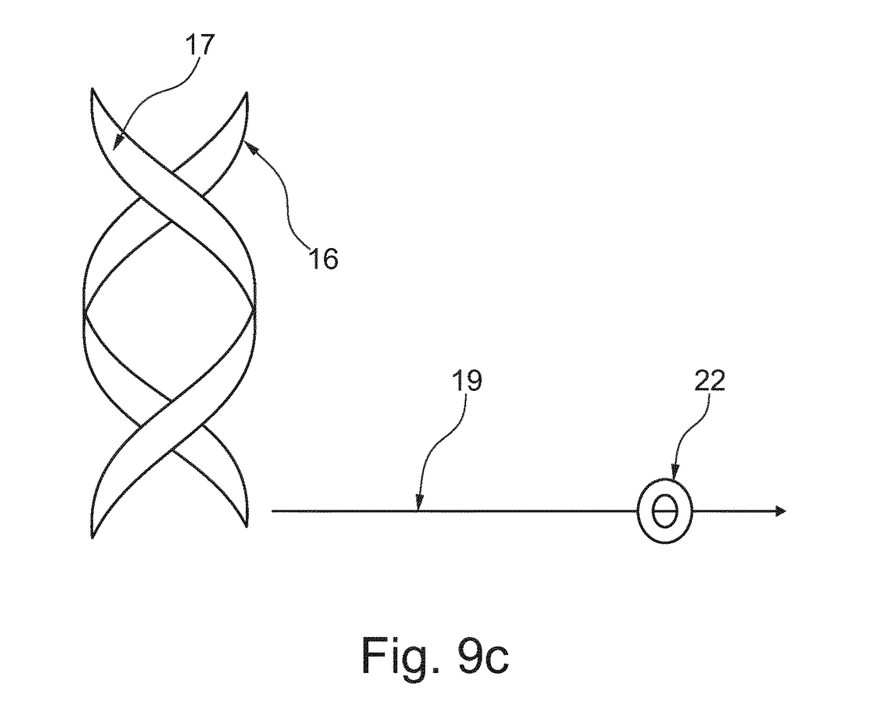

FIGS. 9a, b and c show the patterns that can be used for the spiral grooves (16 and 17) and the unwinding of fibre (19) into an eye (22), which is the first contact point of the unwind.

Accordingly as shown in FIGS. 4 to 9 the spirals (16, 17) are cut into the surface of the inner cylinder (15) to match the winding pattern of the fibrous material (12, 19) on the spool (13) to be unwound. The mandrel (14) has a key (18) on its inner surface that locates into the spiral grooves (16, 17) such that the spiral grooves (16, 17) act as a keyway. In this way, as the fibrous material (12, 19) is unwound and pulled away from the spool (13) the spool (13) rotates, and, as it rotates it drives the movement of the spool (13) on the mandrel (14) back and forth. The movement is controlled by the interaction of the key (18) and the spiral grooves (16, 17) on the surface of the inner cylinder (15). In this way, the unwinding is matching the winding pattern of the fibrous material (12, 19) and, as such, there is control of the tension of the material as it is unwound provided by the control of the keyway frictional forces.

The invention claimed is:

1. A process for unwinding material from a spool wherein an angle of take off at a first contact point for the unwind is always in the range 0±20°, and wherein the first contact point for the unwind is no more than 600 mm from an axis of rotation of the spool; wherein the material is selected from fibres, tapes and multifilament tows; and wherein the material is unwound at speeds up to 50 meters per minute;
   - wherein the first contact point for the unwind does not move transversely with respect to the axis of rotation of the spool, and wherein the spool is reciprocated transversely relative to the first contact point for the unwind;
   - in which the transverse reciprocal movement of the spool is driven by the unwinding of the material;
   - wherein the spool is rotatably mounted on an axis provided by an inner cylinder disposed within a mandrel so that the spool is free to move backwards and forwards along the mandrel;
   - and wherein the inner cylinder is provided with two intersecting spiral grooves and the mandrel is provided with a key that locates in the spiral grooves to produce reciprocal lateral movement of the mandrel on the inner cylinder when the spool rotates.

2. The process according to claim 1 wherein the unwound material is impregnated with a thermoplastic or thermosetting resin.

3. An apparatus for the unwinding of material from a spool comprising an axis upon which a spool may be rotatably mounted and a static first contact point for the unwound material positioned no more than 600 mm from the axis, wherein an angle of take off at the first contact point for the unwind is always in the range 0±20'; wherein the material is unwound at speeds up to 50 meters per minute;
   - wherein a transverse lateral movement of the spool is driven by the unwinding of the material;
   - wherein a mandrel is rotatably mounted on an inner cylinder such that the mandrel is free to move backwards and forwards relative to the inner cylinder and the first point of contact for the unwind;
   - in which the inner cylinder is provided with two intersecting spiral grooves and the mandrel is provided with a key on its inner surface that locates in the spiral groves to produce reciprocal lateral movement of the mandrel on the inner cylinder when the spool unwinds.

* * * * *